ns Patent Office 3,259,608
Patented July 5, 1966

3,259,608
CYCLODODECYL ACRYLAMIDE AND METHACRYLAMIDE, AND POLYMERS THEREOF
Edward H. Hill and John R. Caldwell, Kingsport, Tenn., assignors to Eastman Kodak Company, Rochester, N.Y., a corporation of New Jersey
No Drawing. Filed Sept. 17, 1962, Ser. No. 224,208
12 Claims. (Cl. 260—82.1)

This invention relates to cyclododecyl acrylamide and methacrylamide, to resinous polymers thereof, and to processes for preparing these compounds.

Acrylic amides are known to produce polymeric materials that are useful for the preparation of coatings, sheet materials, etc., and certain interpolymers and graft copolymers thereof, for example, with acrylonitrile have found further utility for the preparation of fibers and molded articles of improved dyeability. However, none of these prior art polymeric materials have proven entirely satisfactory from a commercial standpoint. We have now found that acrylamidic polymers of improved physical properties and of wider commercial applications can be prepared from acrylic amides having an N-substituted alicyclic ring group of relatively high carbon content, i.e. cyclododecyl group of the empirical formula $-C_{12}H_{23}$. The new class of monomeric amides may be conveniently represented by the following structural formula:

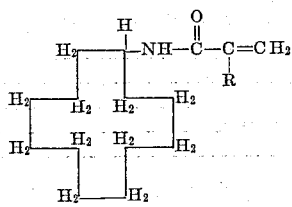

wherein R represents hydrogen or a methyl group. The polymers prepared from the above defined acrylic amides of the invention have unusually high softening or sticking points ranging about from 100–260° C., and may be readily molded or extruded by the usual methods to give films, rods, and other shaped articles. Many of these polymers can also be dissolved in solvents and spun by wet or dry methods to give fibers of excellent physical properties.

It is, accordingly, an object of the invention to provide a new class of acrylic amides containing an N-alicyclic ring group of 12 carbon atoms. Another object is to provide soluble polymers of the above compounds which are especially suitable for coating, molding, extruding and fiber-forming purposes. Another object is to provide methods for preparing the above mentioned monomers and polymers. Other objects will become apparent hereinafter.

In accordance with the invention, we prepare the new monomeric cyclododecyl acrylamide and methacrylamide by the general method of H. Plaut et al., described in J. Am. Chem. Soc., 73, 4076 (1951), wherein acrylonitrile or methacrylonitrile is condensed with the appropriate alcohol or olefin, in this case with cyclododecanol or cyclododecene in the presence of a condensation catalyst such as for example sulfuric acid. The monomer product may be separated from the reaction mixture by conventional means of separation, for example, precipitation into a nonsolvent such as chilled water or ice and recrystallization from a solvent such as aqueous ethanol. The proportions of the reactants may vary so that one or the other will be present in slight excess of equivalent quantities, but approximately equimolar proportions have been found to give good results. The temperature of the reaction may be varied about from 40–100° C., and preferably about 40–60° C. Normal, reduced or above atmospheric pressures may be used as desired.

The polymerizations of the new compounds of the invention alone or conjointly with one or more other ethylenically unsaturated, polymerizable compounds containing at least one (I) $\quad -CH=C<$ group, or more especially containing a single (II) $\quad CH_2=C<$ group, are accelerated by heat, by actinic light such as ultraviolet radiation and by polymerization catalysts such as peroxides including hydrogen peroxide, organic peroxides such as benzoyl peroxide, etc., persulfates such as ammonium persulfate, sodium persulfate, potassium persulfate, persulfuric acid, etc., perborates such as sodium perborate or other alkali metal perborates, azo-bis-nitriles, etc. Other catalysts such as boron trifluoride, azines, ketazines, etc. can also be used. Catalysts that are soluble in the organic phase include benzoyl peroxide, acetyl peroxide, tert-butyl hydroperoxide and azobis (isobutyronitrile). Mixtures of one or more of the mentioned catalysts can be employed. The amount of catalyst used can vary between the limits of about from 0.2 to 3.0% based on the weight of monomer to be polymerized. The temperature of polymerization can vary over a wide range, but preferably the polymerizations are carried out at about from 30–100° C. Advantageously, a solvent or nonsolvent reaction medium may be employed including organic solvents such as lower alcohols, ketones or esters. Other solvents such as the aromatic or aliphatic hydrocarbons, dioxane and the glycol monoethers may be employed. The preferred nonsolvent is water. Mass or bulk polymerizations may also be used. For the polymerizations in water or aqueous systems, an emulsifying or dispersing agent in an amount of about 1–5% of the weight of the monomers can be employed with advantage. Suitable emulsifying agents include salts of higher fatty acids, e.g. sodium or potassium stearate, palmitate, etc., salts of higher fatty alcohol sulfates, e.g. sodium or potassium lauryl sulfate, sodium or potassium octadecyl sulfate, etc., sodium or potassium dodecyl benzene sulfonate, ordinary soaps, sulfonated mineral oils, and the like. Advantageously, an activating agent such as sodium bisulfite can be used in conjunction with the polymerization catalyst in about similar amount. Chain regulators such as alkyl mercaptans, e.g. hexyl, octyl, lauryl, etc. mercaptans can be added with advantage to the polymerization reaction mixtures. The polymeric products obtained by the above procedures can then be isolated, washed and dried by conventional methods for separating polymers from their polymerization mixtures.

The comonomers that are suitable for copolymerizing with the cyclododecyl acrylamide and methacrylamide of the invention include, for example, those described in U.S. Patent No. 2,396,785, dated March 19, 1946. Typical examples include alkyl acrylates and methacrylates wherein the alkyl group in each instance contains from 1–4 carbon atoms, e.g. methyl acrylate, propyl acrylate, n-butyl acrylate, etc., and the corresponding methacrylates, vinyl carboxylic esters, e.g. vinyl acetate, vinyl propionate, vinyl butyrate, vinyl stearate, vinyl benzoate, etc., the corresponding isopropenyl carboxylic esters, vinyl alkyl ethers and ketones, e.g. vinyl methyl ether, vinyl butyl ether, vinyl methyl ketone, vinyl ethyl ketone, etc., vinyl halides, e.g. vinyl chloride, vinyl fluoride, vinylidene chloride, tetrafluoroethylene, chlorotrifluoroethylene, etc., styrenes, e.g. styrene, α-methylstyrene, p-acetaminostyrene, p-methylstyrene, α-acetoxystyrene, etc., acrylic amides, e.g. acrylamide, methacrylamide, and N-alkyl and N,N-dialkyl substituents thereof wherein the alkyl group in each instance contains from 1–4 carbon atoms, N-vinyl imides, N-vinyl lactams, derivatives of unsaturated dibasic acids, e.g. maleates, maleamides, maleamates, maleimides, etc., the esters, amides and ester-amides of fumaric, itaconic and citraconic acids, olefinic hydrocarbons and derivatives such as ethylene, isobutylene, butadiene, isoprene, 2,3-dimethylbutadiene, 2-chlorobutadiene, 2-cyanobutadiene, 2-phenylbutadiene and 2-acetoxybutadiene, and the like. The properties of the components in the interpolymers can vary from 10–95% by weight of the cyclododecyl acrylamide or methacrylamide and from 90–5% by weight of the other polymerizable comonomer. In general, the copolymers obtained have been found to contain approximately the same proportion of components or substituents as were present in the starting polymerization mixtures.

The following examples further illustrate the novel monomers of the invention, the novel polymers thereof, and the manner of preparing the same.

*Example 1.—N-Cyclododecyl Acrylamide*

To a chilled 50 g. portion of concentrated sulfuric acid were added 10.6 g. (0.2 mole) of acrylonitrile. To this solution were slowly added 36.8 g. (0.2 mole) of cyclododecanol with stirring. The reaction mixture was maintained at a temperature of 45–50° C. Stirring was continued for an hour after the addition was finished. The temperature of the mixture slowly fell to 30° C. The mixture was poured into 600 g. of cracked ice, with vigorous stirring. The oily layer gradually solidified. The solid was filtered, crushed to a fine paste and washed with ice water. The crude amide was then recrystallized from aqueous alcohol. The melting point was 91–93° C.

*Example 2.—N-Cyclododecyl Methacrylamide*

The reaction of Example 1 was repeated, except that 13.4 g. (0.2 mole) of methacrylonitrile were used in place of the acrylonitrile. The product N-cyclododecyl methacrylamide melted at 74–78° C.

The cyclododecanol used in above Examples 1 and 2 can be replaced with an equivalent amount of cyclododecene to give the same products in about the same yields.

*Example 3*

The following materials were placed in a pressure bottle and tumbled at 50° C. for 24 hours:

| | | |
|---|---|---|
| Acrylonitrile | g. | 70 |
| Cyclododecyl acrylamide | g. | 30 |
| Acetonitrile | ml. | 300 |
| Azobis (isobutyronitrile) | g. | 1.0 |

A clear, viscous dope was obtained which was dry spun to give fibers having the following physical properties:

| | | |
|---|---|---|
| Tenacity | g./d. | 2.1 |
| Elongation | percent | 18 |
| Hot bar sticking point | | 204° C. |
| Flow point at 0.2 g./d. | | 200° C. |

*Example 4*

The following materials were placed in a pressure bottle and tumbled at 50° C. for 18 hours:

| | | |
|---|---|---|
| Acrylonitrile | g. | 80 |
| Cyclododecyl acrylamide | g. | 20 |
| Water | ml. | 500 |
| Lauryl sulfate | g. | 4.0 |
| Ammonium persulfate | g. | 1.0 |
| Sodium bisulfite | g. | 0.5 |
| Tert-dodecyl mercaptan | g. | 0.5 |

The polymer was filtered, washed with water then isopropyl alcohol, and dried. It weighed 93.8 g. It was dissolved in dimethylformamide and wet spun into fibers having the following properties:

| | | |
|---|---|---|
| Tenacity | g./d. | 3.6 |
| Elongation | percent | 15 |
| Hot bar sticking point | | 240–250° C. |
| Flow point at 0.2 g./d. | | 256° C. |

*Example 5*

Using the method of Example 4, a copolymer was prepared having the composition 75 parts acrylonitrile—25 parts cyclododecyl methacrylamide. The polymer was compression molded into buttons having the following properties:

| | | |
|---|---|---|
| Modulus | p.s.i. | 3.9×10⁵ |
| Elongation | percent | 10 |
| Tensile strength | p.s.i. | 8500 |
| Heat distortion temperature | | 130° C. |

*Example 6*

Using the method of Example 4, a copolymer was prepared having the composition 80 parts acrylonitrile—20 parts cyclododecyl methacrylamide. It was dissolved in dimethylformamide and wet spun into fibers having the following properties:

| | | |
|---|---|---|
| Tenacity | g./d. | 3.4 |
| Elongation | percent | 18 |
| Hot bar sticking point | | 231° C. |
| Flow point at 0.2 g./d. | | 230° C. |

*Example 7*

The following materials were placed in a pressure bottle and tumbled at 50° C. for 20 hours:

| | | |
|---|---|---|
| Cyclododecyl acrylamide | g. | 65 |
| Vinyl chloride | g. | 35 |
| Sulfonated mineral oil | g. | 2.0 |
| Ammonium persulfate | g. | 1.0 |
| Water | ml. | 800 |

The product was a white powder which after washing and drying weighed 89 g. The polymer was soluble in cyclohexanone and could be cast into clear, tough films.

*Example 8*

The following materials were placed in an autoclave:

| | | |
|---|---|---|
| Cyclododecyl acrylamide | g. | 30 |
| Butadiene | g. | 70 |
| Soap | g. | 3.0 |
| Potassium persulfate | g. | 1.0 |
| Water | ml. | 400 |

The mixture was stirred at 70° C. for 48 hours. The product was a rubbery material which weighed 84 g.

*Example 9*

Using the method of Example 3, a copolymer was prepared having the composition 65 parts cyclododecyl methacrylamide–35 parts methyl methacrylate. It could be compression molded into clear, hard buttons.

*Example 10*

The following materials were mixed in a pressure bottle and tumbled at 50° C. for 24 hours:

| | | |
|---|---|---|
| Cyclododecyl acrylamide | g. | 50 |
| Tert-butyl alcohol | ml. | 300 |
| Azobis(isobutyronitrile) | g. | 0.5 |

The homopolymer obtained was soluble in dioctyl sebacate and was useful as a viscosity stabilizer in this synthetic lubricant. In place of the cyclododecyl acrylamide there can be substituted a like amount of cyclododecyl methacrylamide to give the corresponding homopolymer. The above homopolymers showed hot bar sticking points of 105° and 115° C.

Example 11

Using the method of Example 4, a copolymer was prepared having the composition 77 parts styrene–23 parts cyclododecyl methacrylamide. It could be molded into objects having excellent optical clarity and impact strength.

Example 12

Using the method of Example 4, a copolymer was prepared having the composition 50 parts vinyl stearate–50 parts cyclododecyl acrylamide. The polymer was soluble in mineral oil and was useful as a viscosity stabilizer in oils.

Example 13

Using the method of Example 4, a copolymer was prepared having the composition 60 parts vinylidene chloride–40 parts cyclododecyl acrylamide. Clear, strong films could be cast from dioxane.

Example 14

Using the method of Example 4, a copolymer was prepared having the composition 70 parts methacrylonitrile–30 parts cyclododecyl methacrylamide. It could be cast into clearly flexible films from a solution of acetone.

Still other copolymers coming within the defined limits of the invention and in the specified proportions of from 10–95% of the cyclododecyl acrylamide and methacrylamide and from 90–5% of the comonomer can be prepared with any of the mentioned comonomers of above I and II by substituting them in the procedures of the above copolymeric examples. Thus, copolymers of generally similar characteristics are obtained with comonomers such as vinyl and isopropenyl carboxylic esters, vinyl alkyl ethers and ketones, vinylidene fluoride, N-vinyl imides, N-vinyl lactams, alkyl esters of maleic, fumaric, itaconic and citraconic acids, N-alkyl substituted acrylamides and methacrylamides, etc. The homopolymers and all of the copolymers of the invention are soluble in one or more organic solvents from which solutions they can be spun into fibers or coated into tough, flexible films, sheets, etc. Also, they can be readily converted to shaped articles by injection and compression molding techniques. If desired, the above solutions and compositions may advantageously have incorporated therein various materials such as fillers, pigments, dyes, plasticizers and the like.

The invention has been described in detail with particular reference to preferred embodiments thereof, but it will be understood that variations and modifications can be effected within the spirit and scope of the invention as described hereinabove and as defined in the appended claims.

What we claim is:

1. A compound selected from the group consisting of cyclododecyl acrylamide and cyclododecyl methacrylamide.
2. Cyclododecyl acrylamide.
3. Cyclododecyl methacrylamide.
4. A resinous polymer of a compound selected from the group consisting of cyclododecyl acrylamide and cyclododecyl methacrylamide.
5. A resinous copolymer of from 10–95% by weight of cyclododecyl acrylamide and from 90–5% by weight of acrylonitrile.
6. A resinous copolymer of from 10–95% by weight of cyclododecyl acrylamide and from 90–5% by weight of vinyl chloride.
7. A resinous copolymer of from 10–95% by weight of cyclododecyl acrylamide and from 90–5% by weight of butadiene.
8. A resinous copolymer of from 10–95% by weight of cyclododecyl acrylamide and from 90–5% by weight of vinylidene chloride.
9. A resinous copolymer of from 10–95% by weight of cyclododecyl methacrylamide and from 90–5% by weight of acrylonitrile.
10. A process for preparing a resinous polymer selected from the group consisting of a polymer of cyclododecyl acrylamide and a polymer of cyclododecyl methacrylamide which comprises heating at from 30–100° C. a mixture comprising a polymerization catalyst and monomeric material selected from the group consisting of cyclododecyl acrylamide and cyclododecyl methacrylamide.
11. The process according to claim 10 wherein the said monomeric material is cyclododecyl acrylamide.
12. The process according to claim 10 wherein the said monomeric material is cyclododecyl methacrylamide.

References Cited by the Examiner

UNITED STATES PATENTS

| | | | |
|---|---|---|---|
| 2,732,369 | 1/1956 | Caldwell et al. | 260—82.1 |
| 2,790,789 | 4/1957 | Miller | 260—85.5 |
| 2,995,570 | 8/1961 | Winberg | 260—617 |

OTHER REFERENCES

Plaut et al.: J.A.C.S. 73 (1951) pages 4076–4077.

JOSEPH L. SCHOFER, *Primary Examiner.*

E. J. SMITH, *Assistant Examiner.*